G. W. SWIFT, Jr.
VARIABLE AUTOMATIC CONTROL MECHANISM.
APPLICATION FILED DEC. 6, 1918.
1,343,487.
Patented June 15, 1920.
4 SHEETS—SHEET 2.
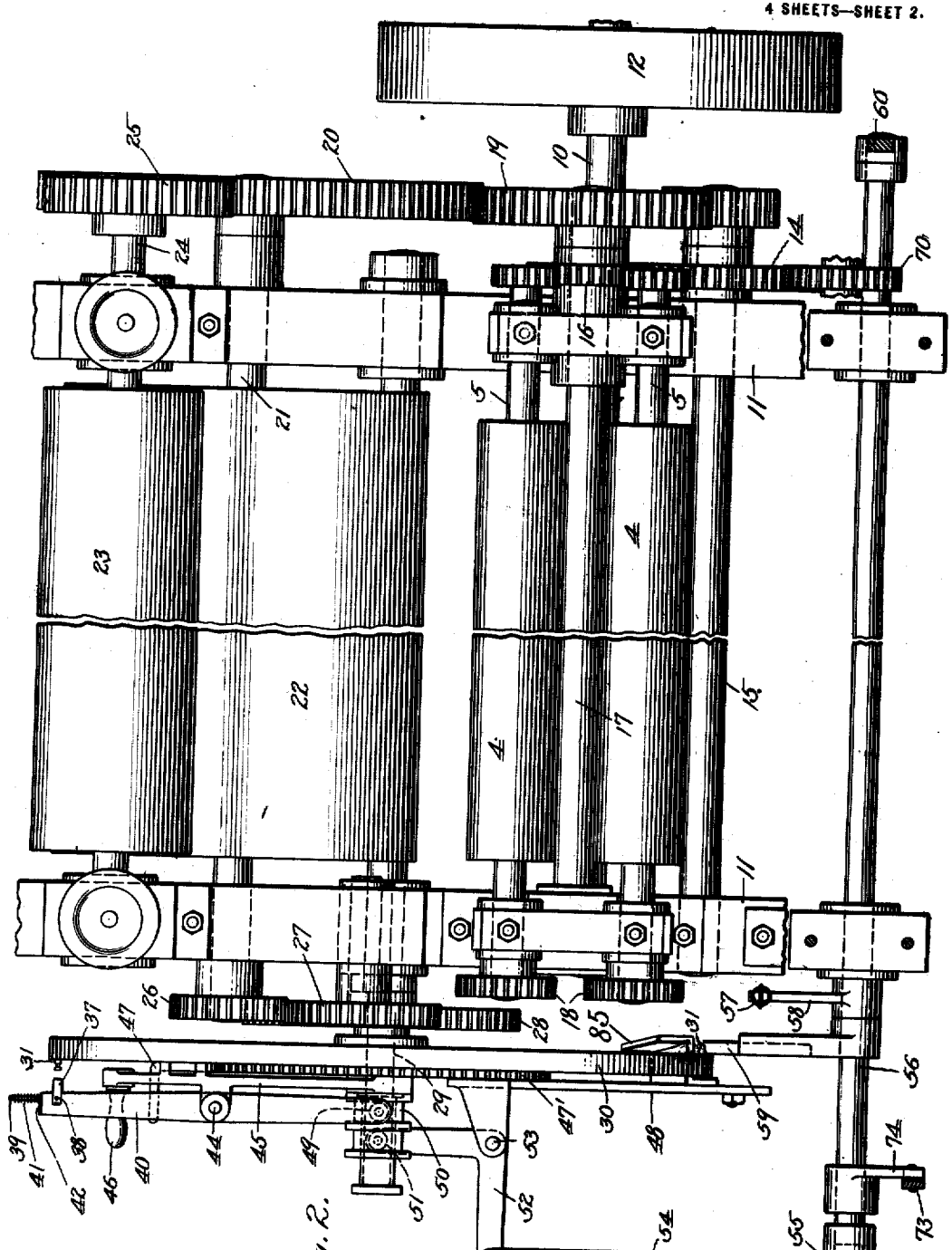

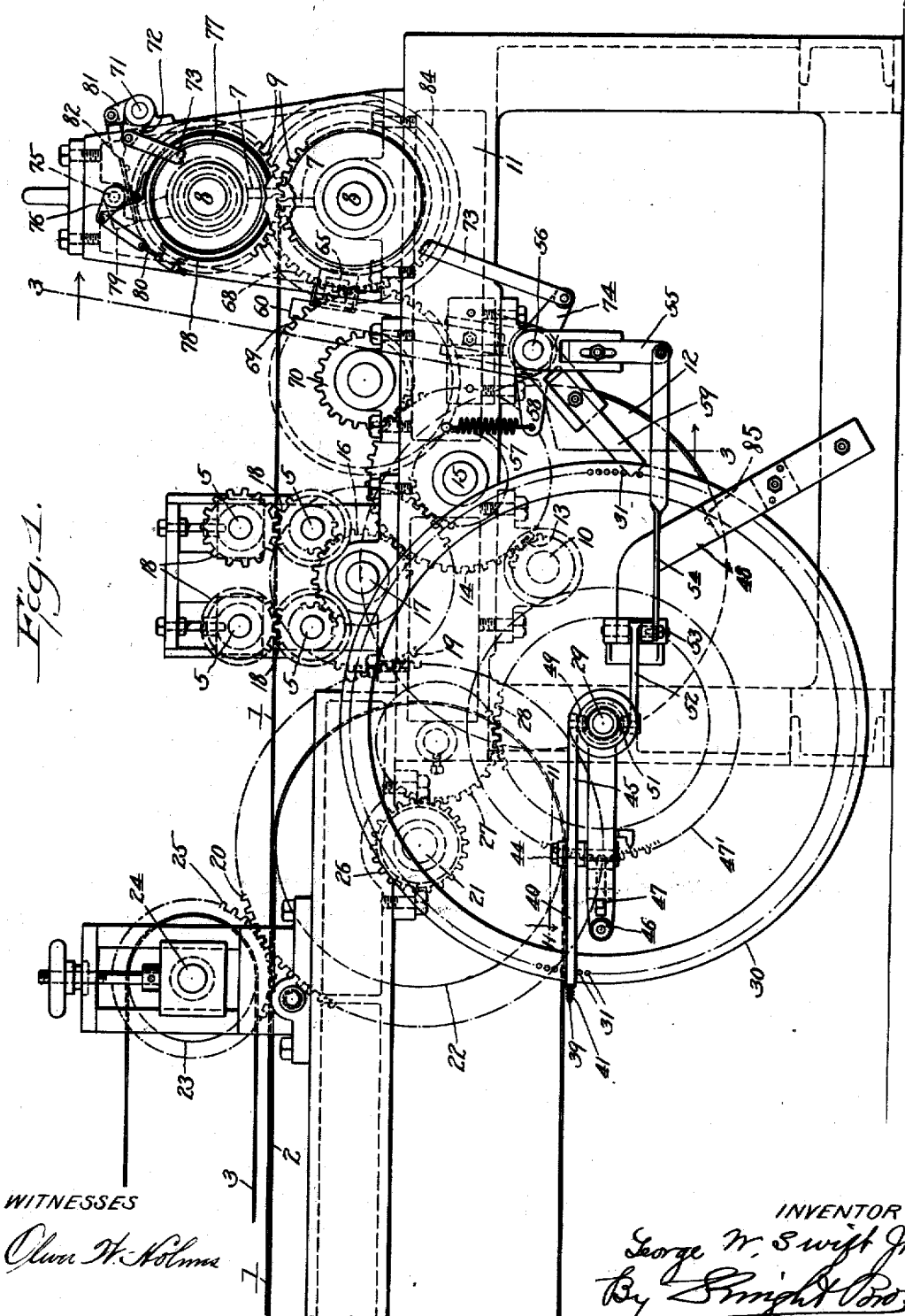

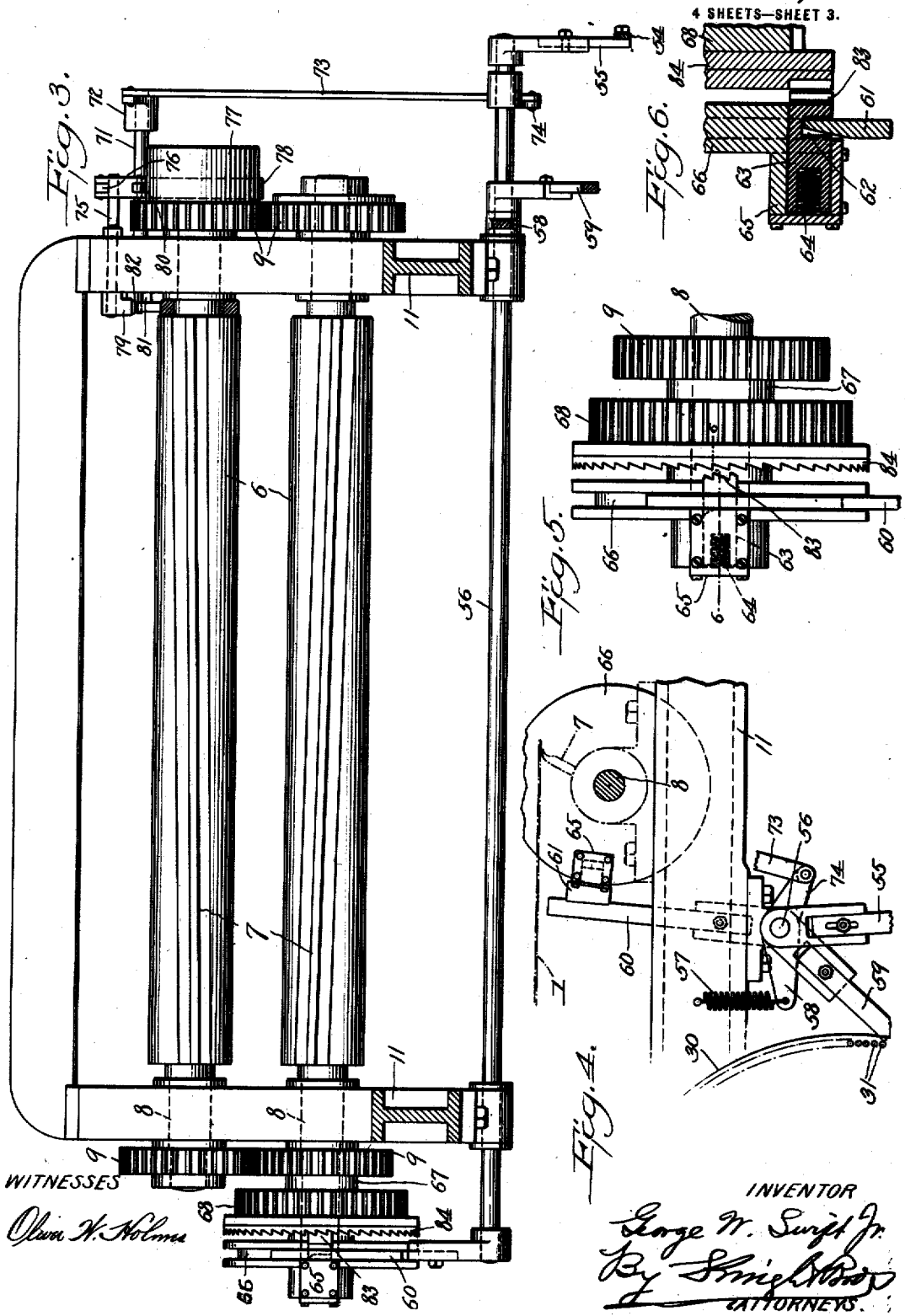

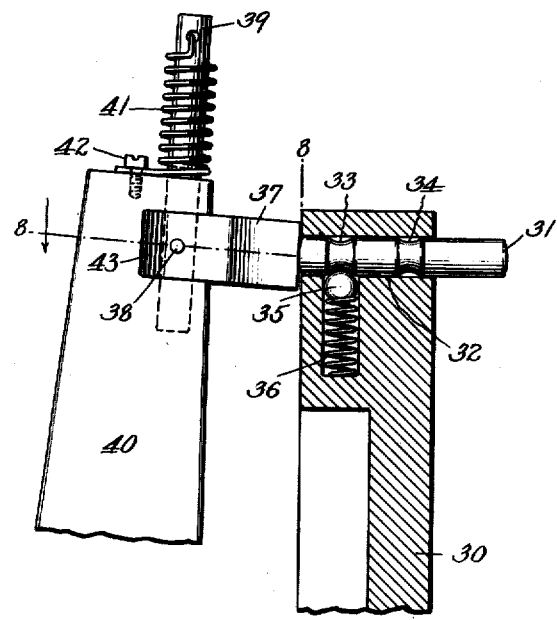
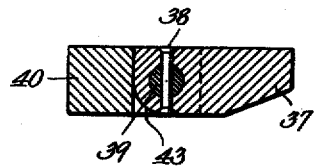
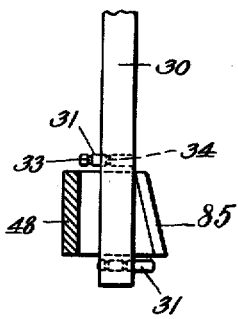
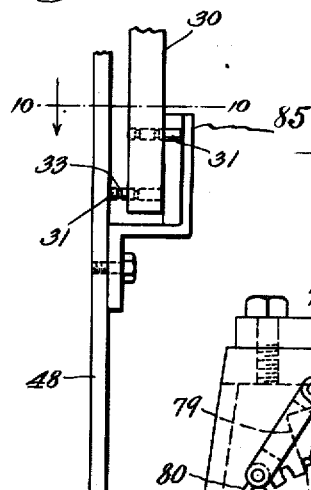
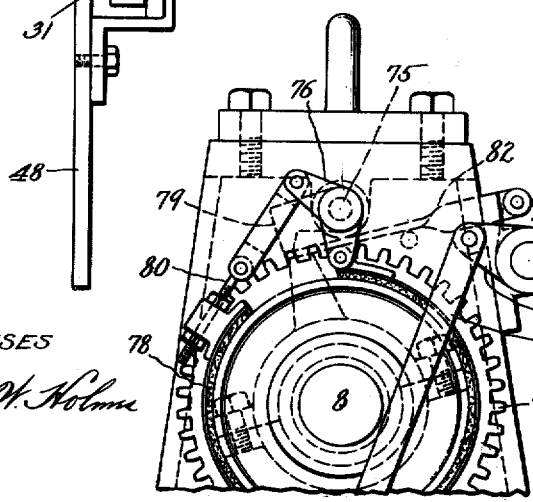
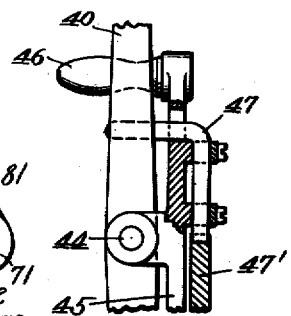

UNITED STATES PATENT OFFICE.

GEORGE W. SWIFT, JR., OF BORDENTOWN, NEW JERSEY.

VARIABLE AUTOMATIC CONTROL MECHANISM.

1,343,487.   Specification of Letters Patent.   Patented June 15, 1920.

Application filed December 6, 1918. Serial No. 265,652.

*To all whom it may concern:*

Be it known that I, GEORGE W. SWIFT, Jr., a citizen of the United States, residing at Bordentown, county of Burlington, and State of New Jersey, have invented certain new and useful Improvements in Variable Automatic Control Mechanism, of which the following is a specification.

This invention relates to mechanism for controlling the sequence of operations in a machine. As exemplified in the present embodiment, the invention contemplates improved means for selectively controlling the periodicity of the operations of a machine which may be governed automatically to vary in their periods of duration as well as in their sequence. One of the objects of the present invention is to provide improved means for automatically controlling the recurrence of operations by means of the actuating elements which operate the parts which control the machine and at the same time set other actuating elements which subsequently become operative. Another object is to provide improved means for varying the periods of time between the successive operations.

In the drawings, which show an application of the invention to a machine for cutting successive sheets from a roll or web:—

Figure 1 is a side elevation of a web cutting machine provided with improvements according to the present invention;

Fig. 2 is a top plan view of the same;

Fig. 3 is a section on the line 3—3, Fig. 1;

Fig. 4 is a fragmentary side elevation of parts shown in Fig. 1;

Fig. 5 is a top plan view on an enlarged scale of the clutch mechanism shown in Fig. 3;

Fig. 6 is a section on the line 6—6, Fig. 5;

Fig. 7 is a fragmentary section on an enlarged scale of the actuator wheel or disk, parts being shown in plan;

Fig. 8 is a section on the line 8—8, Fig. 7;

Fig. 9 is a fragmentary front elevation on an enlarged scale, of the actuator elements returning means;

Fig. 10 is a section according to line 10—10, Fig. 9, a fragmentary portion of the actuator wheel or disk being shown in plan;

Fig. 11 is a fragmentary top plan view and section of the actuator adjusting means; and Fig. 12 is a side elevation of the brake operating connections, parts being shown in section.

According to the drawings, the invention is applied to a web-cutting machine in which a web 1 is advanced upon a lower feed belt 2 and between it and an upper feed belt 3. Paired feed rolls 4 carried by the transverse shafts 5, drive the web 1 forwardly to pass between rolls 6 which are provided with web-cutting knives 7 arranged askew on the rolls 6 for making a cut across the web 1. Said rolls 6 are carried by shafts 8 to which are keyed the intermeshing gears 9. These rolls 6 and knives 7 remain at rest during certain intervals between the cutting operations which occur periodically. For this purpose the cutter rolls are positively held against rotation until they are released when they revolve to effect the cutting operation and return to their position of rest until the next operation. The present invention is shown on the drawings as applied to the control of these cutting periods. Referring now to Figs. 1 and 2, the drive shaft 10 is journaled in brackets on the side frames 11 and is provided with a driving pulley 12. Keyed to the drive shaft 10 is a gear 13 which meshes with a gear 14 keyed to the shaft 15. Said gear 14 also meshes with a gear 16 carried by a shaft 17. Feed roll shafts 5, 5, are provided with intermeshing gears 18 and the lower shaft of each pair is provided with an additional gear which meshes with gear 16 which is thereby adapted to transmit power to the feed rolls 4, 4. The shaft 17 has another gear 19 keyed thereto, which meshes with a large gear 20 for driving the roll shaft 21 which supports the lower feed belt roll 22. The upper feed belt roll 23 is carried by the shaft 24 to which is keyed a gear 25 which meshes with gear 20. A small gear 26 which is keyed to the shaft 21, meshes with an idler 27 which in turn drives a gear 28 keyed to a shaft 29 which carries an actuator wheel or disk 30. A fragmentary radial section of this wheel or disk 30 is shown in Fig. 7 according to which an actuator element 31 is reciprocably mounted in a hole or socket 32 which extends from side to side of the actuator wheel or disk. The element 31 is provided with spaced annular recesses 33, 34 which are adapted to receive a ball pawl 35 which is yieldably held in engagement with either of said recesses by means of a spring 36. Preferably and according to the present embodiment of my invention, there are 280 actuator elements arranged around the periphery of the actuator 30. Coöperating with these elements 31 is a hammer 37 which is secured by a pin 38 to a spindle 39, said spindle being journaled in the outer end of a lever 40. A spring 41 is secured at one end to the lever 40, by means of a screw 42. Said spring is wound about the spindle 39 and has its other end extending through a hole in the outer end of said spindle and thus serves to retain the hammer 37 in the position shown in Fig. 8. In order to permit a clockwise displacement of the hammer, should it happen to come between two adjacent actuator elements, one corner is rounded at 43. As shown best in Fig. 2, the lever 40 is pivoted at 44 on an arm 45, said arm 45 being suitably mounted to swing on the shaft 29 into any desired position radially with respect to the shaft 29. For this purpose, it is provided on its outer end with a handle 46. Reciprocably mounted on the angularly adjustable arm 45 is a latch 47 (see Fig. 11) which is adapted to engage in the notches of setting disk or plate 47' which is supported by the shaft 29 but does not turn therewith. A connecting band or bracket 48 is secured at one end to the notched disk or plate 47' and at its outer end is secured to a portion rigid with the side frame 11. Mounted on the band or bracket 48 is a cam plate 85 against which the elements 31, in operative position, are moved by the rotation of the wheel 30 for returning the pins 31 to normal inoperative position. Journaled on the inner end of lever 40 is a roller 49 which is arranged between the adjacent flanges of a spool or sleeve 50 which is reciprocably mounted on the shaft 29 and also accommodates a roller 51 which is journaled on one arm of a bell crank lever 52 which is pivoted at 53 on the band or bracket 48. The other arm of said bell crank is connected by a rod 54 to an arm 55 which is secured to a rock shaft 56. It will be seen from this description that whenever the rock shaft 56 is caused to oscillate, sleeve 50 is reciprocated and causes lever 40 to drive an actuator element into operative position, shown in Fig. 7. A spring 57 which extends between a fixed point on the frame and an arm 58, tends to hold the lever 40 in position in which hammer 37 is out of the path of the actuator elements in inoperative position. A lever arm 59 extends radially from the rock shaft 56 into the path of such of the actuator elements that have been moved into operative position by a prior actuation of the rock shaft 56. It will be understood therefore that each actuation sets a new actuator element for another operation and the intervals between such operations will depend upon the angular disposition of the adjustable arm 45. Furthermore, it will be understood that by previously setting a number of the actuator elements by hand, various sequences in the periodic operations may be obtained. In its application to the web-cutting machine hereinbefore referred to, it is preferable to provide a controller arm 60 which is keyed to the rock shaft 56. As shown in Figs. 4, 5 and 6, this controller arm carries a wedge 61 which is adapted to move into and out of a recess 62 in a slide 63. In the normal position of rest of the rock shaft 56, the wedge 61 is held in engagement with the slide 63 and hence prevents a compression spring 64 from forcing slide 63 toward the right according to Fig. 6. The slide 63 reciprocates in a box or guide 65 which is secured to the flanged wheel or disk 66. Said wheel or disk is keyed to the shaft 8 and partakes of the movements of the cutter rolls 6 which are geared together by the gears 9. Freely journaled on the shaft 8 and arranged between the gear 9 and the flanged wheel or disk 66, is a sleeve 67 which is keyed to a gear 68 which meshes with the larger gear 69 of a compound gear. The smaller gear 70 of this compound gear meshes with the gear 14 which drives the feed rolls 5, 5. Referring now to Figs. 1 and 12, an oscillatory shaft 71 is provided with a lever arm 72 which is connected by a rod 73 with a lever arm 74 keyed to rock shaft 56. Journaled in the frame above the upper cutter roll 6, is an oscillatory brake shaft 75 to which is keyed a brake lever 76 having arms extending substantially radially and tangentially with respect to a brake drum 77 (see also Fig. 3) which is keyed to the shaft 8. A brake band 78 has opposite ends connected to the arms of said brake lever 76, the arrangement being such that when the brake shaft 75 is oscillated in one direction, the brake band is loosened, whereas if it is oscillated in the opposite direction the brake band is tightened around the drum 77. Keyed to the brake shaft 75 is a dog or lever arm 79. Secured to the roll shaft 8 is a radially disposed thrust arm 80. An arm 81 which is keyed to oscillatory shaft 71, has pivotally connected thereto a link 82 which reciprocates into and out of position to transmit a thrust from said thrust arm 80 to the lever arm 79 in a direction which binds the brake band to the brake drum and locks the cutter rolls in a position of rest just as the slide 63 is moved to the left in Fig. 5. Said slide 63 is provided with clutch teeth 83 which adapts it to coöperate with a toothed clutch disk 84 which as shown in Figs. 5 and 6, is rigid with the gears 9 and 68 on the sleeve 67.

The practical utility of the present invention will now be understood from a brief recital of its functions according to the present embodiment. Thus the actuator pin-wheel 30 shown on the drawings, carries 280 pins. With the gearing shown and described, the paper feed rolls 4 advance the paper web one-half inch during the time that the wheel 30 moves over the angular space between the axes of two adjacent pins 31. For each rotation of wheel 30, there are therefore 140 inches of travel imparted to the paper web 1. If then, it is desired to cut two sheets of 70 inches in length each for every rotation of the wheel 30, the arm 45 is adjusted to such position as will cause the hammer 37 to strike a pin 31 diametrically opposite to a prior active pin which has been pushed into operative position. Each successive operation will then set the following actuator pin which is to become active. In this instance, the cam plate 85 may be dispensed with, if desired, since each active element after it has been returned to normal inoperative position by the cam plate 85, is reset to operative position by the hammer 37. Furthermore, said cam plate may be dispensed with when any whole number of sheets of like or unlike lengths are severed from the web during each rotation of the wheel 30. On the other hand, when the wheel 30 completes a rotation out of time with the severance of any sheet, it becomes necessary to reset the operating elements for each revolution of the wheel 30 and in consequence, the cam plate 85 must be provided for returning the pins 31 to normal position after each action. At each operation, rock shaft 56 is oscillated. As the lever arm 60 is withdrawn from the flanged pulley 66, the wedge 61 releases the slide 63 to be engaged by the continuously rotating clutch disk 84. The same movement serves to withdraw the link 82 which releases the brake band 78 and permits the cutter rolls 6 to be rotated by the pulley 66 which is geared thereto. At the same time, the next actuator pin is set by the operation of lever arm 55, rod 54, lever 52, sleeve 50 and lever 40. It will be understood that by setting the arm 45 in any desired position and by manually setting one or more pins before the machine is set in operation, it is possible to produce various sizes and variations in sizes of sheets cut from the web. The device therefore provides a variable automatic control of the function of the machine to which it is connected.

I claim:—

1. In a variable automatic control mechanism, a continuously movable actuator, a plurality of actuating elements movable into and out of actuating positions, periodic means for shifting said elements from one position to the other, and means for yieldably holding said elements in their different positions.

2. Variable automatic control mechanism comprising a continuously movable actuator provided with a plurality of actuating elements movable into and out of actuating positions, and means operated by the movement of said actuator for shifting said elements from one position to the other.

3. Variable automatic control mechanism comprising a continuously movable actuator provided with a plurality of actuating elements movable into and out of actuating positions, and means operated by the movement of said actuator for shifting said elements from one position to the other, said actuator being provided with means for yieldably holding said elements in their different positions.

4. In a variable automatic control mechanism, a movable actuator, actuating elements movable on said actuator between operative and inoperative positions, an instrumentality suitably arranged to be operated by an actuating element in operative position, and means adapted to be operated by said instrumentality for moving another actuating element from inoperative into operative position.

5. In a variable automatic control mechanism, a movable actuator, actuating elements movable on said actuator between operative and inoperative positions, an instrumentality suitably arranged to be operated by an actuating element in operative position, means adapted to be operated by said instrumentality for moving another actuating element from inoperative into operative position, and means operative upon each of said elements in operative position for returning it to inoperative position after it has passed by said instrumentality.

6. In a variable automatic control mechanism, a rotary wheel or actuator, actuator elements reciprocable parallel to the rotary axis of said actuator wheel, an instrumentality to be actuated for controlling the operation of another mechanism, said instrumentality being adapted to be actuated by said actuator elements at one extreme of their movement, and means driven by said instrumentality for moving said elements into operative position.

7. In a variable automatic control mechanism, a rotary wheel, actuator elements reciprocably mounted on said wheel, a lever suitably disposed to be operated by an actuator element in one of its positions, and means operated by said lever for moving one of said elements into said position.

8. In a variable automatic control mechanism, a rotary wheel, actuator elements reciprocably mounted on said wheel, a lever suitably disposed to be operated by an actuator element in one of its positions, and means operated by said lever for moving one of said elements into said position, said means including an oscillatory member adjustable into different relative positions with respect to said lever.

9. In a variable automatic control mechanism, a rotary wheel, actuator elements reciprocably mounted on said wheel on axes parallel to the rotary axis of said wheel, a lever suitably disposed to be operated by said actuator elements at one extreme of their movements, another lever for moving said elements into operative position, and means operated by the first-mentioned lever for actuating the second-mentioned lever.

10. In a variable automatic control mechanism, a rotary wheel, actuator elements reciprocably mounted on said wheel on axes parallel to the rotary axis of said wheel, a lever suitably disposed to be operated by said actuator elements at one extreme of their movements, another lever for moving said elements into operative position, and means operated by the first-mentioned lever for actuating the second-mentioned lever, said second-mentioned lever being angularly adjustable about the axis of said wheel while connected up with said actuating means.

11. In a variable automatic control mechanism, a rotary actuator provided with a plurality of actuator elements separately reciprocable parallel to the rotary axis of said actuator, between operative and inoperative positions, a power transmitting train adapted to be moved by each of said elements in operative position, and means operatably connected to said power transmitting train for moving another actuator element from inoperative to operative position at each operation of said train by an actuator element.

12. In a variable automatic control mechanism, a rotary actuator provided with a plurality of actuator elements separately reciprocable parallel to the rotary axis of said actuator, between operative and inoperative positions, a power transmitting train adapted to be moved by each of said elements in operative position, and means operatably connected to said power transmitting train for moving another actuator element from inoperative to operative position at each operation of said train by an actuator element, said actuator element moving means being adjustable to operate upon actuator elements at various angular distances from the operative element.

13. In a variable automatic control mechanism, an actuator provided with a plurality of actuator elements movable between operative and inoperative positions on said actuator, tripping mechanism for controlling the operation of a machine, said tripping mechanism including a lever between which and said actuator there is relative movement, said lever being normally in the path of any of said actuator elements in operative position, means adjustably mounted on said actuator for selectively moving said actuator elements into operative position, and means operatively connecting said adjustably mounted means to said tripping lever for moving said actuator elements into operative position.

14. In a variable automatic control mechanism, an actuator provided with a plurality of actuator elements movable between operative and inoperative positions on said actuator, tripping mechanism for controlling the operation of a machine, said tripping mechanism including a lever between which and said actuator there is relative movement, said lever being normally in the path of any of said actuator elements in operative position, means adjustably mounted on said actuator for selectively moving said actuator elements into operative position, and means operatively connecting said adjustably mounted means to said tripping lever for moving said actuator elements into operative position, means being provided in the path of said actuator elements for returning them to inoperative position.

15. In a variable automatic control mechanism, a rotary actuator, actuator elements movable on said actuator between operative and inoperative positions, a trip lever through which the operation of a machine is controlled, said lever being normally disposed in the path of said actuator elements when in operative position, an arm adjustable about the axis of said rotary actuator, a lever pivotally mounted on said arm for moving said actuator elements into operative position, and means for operatably connecting said trip lever to said actuator elements moving lever.

16. In a variable automatic control mechanism, a rotary actuator, actuator elements movable on said actuator between operative and inoperative positions, a trip lever through which the operation of a machine is controlled, said lever being normally disposed in the path of said actuator elements when in operative position, an arm adjustable about the axis of said rotary actuator, a lever pivotally mounted on said arm for moving said actuator elements into operative position, and means operatably connecting said trip lever to said actuator elements moving lever, said connecting means including a reciprocable sleeve or spool movably connected to said actuator elements moving lever and another lever moved by said trip lever and movably connected to said sleeve or spool.

GEORGE W. SWIFT, Jr.